United States Patent [19]
Wagner et al.

[11] Patent Number: 5,983,932
[45] Date of Patent: Nov. 16, 1999

[54] DUAL TANK FUEL SYSTEM

[75] Inventors: Richard William Wagner, Albion; James Frank Burkhard, Churchville; Kenneth John Dauer, Avon, all of N.Y.

[73] Assignee: General Motors Corporation, Detroit, Mich.

[21] Appl. No.: 08/959,905

[22] Filed: Oct. 29, 1997

[51] Int. Cl.⁶ .................................................. F02M 33/02
[52] U.S. Cl. .................... 137/587; 137/574; 123/509; 123/514
[58] Field of Search ................................. 137/571, 574, 137/587; 123/509, 514

[56] References Cited

U.S. PATENT DOCUMENTS

| | | | |
|---|---|---|---|
| 4,753,262 | 6/1988 | Bergsma | 137/39 |
| 5,078,169 | 1/1992 | Scheurenbrand et al. | 137/574 |
| 5,197,443 | 3/1993 | Hodgkins | 123/514 |
| 5,360,034 | 11/1994 | Der Manuelian | 137/571 |
| 5,392,804 | 2/1995 | Kondo et al. | 137/587 |
| 5,732,684 | 3/1998 | Thompson | 123/514 |
| 5,743,239 | 4/1998 | Iwase | 137/574 |
| 5,797,373 | 8/1998 | Kleppner et al. | 137/574 |

FOREIGN PATENT DOCUMENTS

| | | |
|---|---|---|
| 597175 | 5/1993 | European Pat. Off. . |
| 4337183 | 5/1995 | Germany . |
| 2295362 | 5/1996 | United Kingdom . |

*Primary Examiner*—A. Michael Chambers
*Attorney, Agent, or Firm*—Charles K. Veenstra

[57] ABSTRACT

A dual tank fuel system has primary and secondary fuel tanks, with the primary tank including a filler pipe to receive fuel and a discharge line to deliver fuel to an engine, and with a balance pipe interconnecting the primary tank and the secondary tank. The balance pipe opens close to the bottom of each tank to direct fuel from the primary tank to the secondary tank as the primary tank is filled, and to direct fuel from the secondary tank to the primary tank as fuel is discharged from the primary tank through the discharge line. A vent line has branches connected to each tank to direct fuel vapor from the tanks as the tanks are filled, and to admit air to the tanks as fuel is delivered to the engine.

9 Claims, 5 Drawing Sheets

DUAL TANK FUEL SYSTEM

TECHNICAL FIELD

This invention relates to a fuel system, suitable for automotive use, in which a pair of fuel tanks are interconnected in a manner that simplifies introduction and discharge of liquid fuel.

The Government of the United States of America has rights in this invention pursuant to Subcontract ZCB-3-13032 under Prime Contract No. DE-AC36-83CH10093 awarded by the U.S. Department of Energy.

BACKGROUND OF THE INVENTION

In some applications, automotive fuel systems employ two or more fuel tanks to provide the fuel capacity necessary to achieve a desired driving range. Those applications generally require complex fuel systems, with multiple fuel pumps and fuel level senders.

SUMMARY OF THE INVENTION

This invention provides a dual tank fuel system which avoids the complexity of the prior systems.

The dual tank fuel system provided by this invention has primary and secondary fuel tanks, with only the primary tank including a filler pipe to receive fuel and a discharge line to deliver fuel to an engine, and with a balance pipe interconnecting the primary tank and the secondary tank. The balance pipe opens close to the bottom of each tank to direct fuel from the primary tank to the secondary tank as the primary tank is filled, and to direct fuel from the secondary tank to the primary tank as fuel is discharged from the primary tank through the discharge line. A vent line has branches connected to each tank to direct fuel vapor from the tanks as the tanks are filled, and to admit air to the tanks as fuel is delivered to the engine.

The details as well as other features and advantages of three embodiments of this invention are set forth in the remainder of the specification and are shown in the drawings.

DETAILED DESCRIPTION

Figure 1:
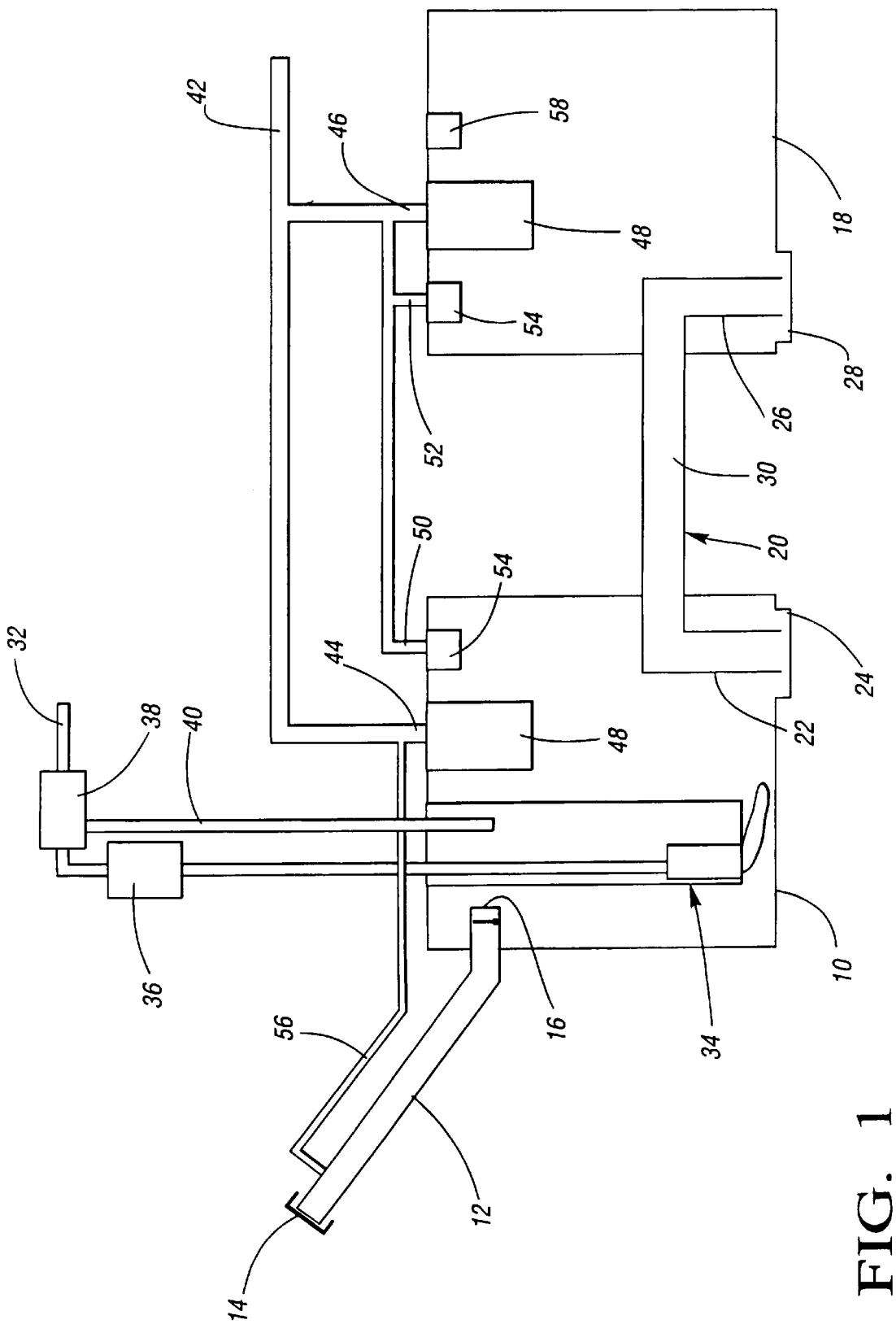
FIG. 1 is a schematic view of a first embodiment of the dual tank fuel system provided by this invention.

Referring first to FIG. 1, an automotive fuel system has a primary fuel tank 10 that includes a filler pipe 12 through which fuel is introduced, and which is closed by a filler cap 14. Filler pipe 12 also may incorporate a valve 16 adapted to prevent back flow from tank 10 out through filler pipe 12.

A secondary fuel tank 18 is connected to primary tank 10 by a balance pipe 20. Balance pipe 20 has a vertical section 22 open to a depression 24 in the bottom of primary tank 10, a vertical section 26 open to a depression 28 in the bottom of secondary tank 18, and an intermediate section 30 interconnecting the vertical sections 22 and 26.

When fuel is introduced to primary tank 10 through filler pipe 12, the fuel level in primary tank 10 rises until it fills balance pipe 20. Then as additional fuel is introduced to primary tank 10, balance pipe 20 transfers fuel to secondary tank 18.

A fuel discharge line 32 extends from primary tank 10 to deliver fuel to an engine (not shown). Within primary tank 10, a fuel pump/fuel level sender assembly 34 delivers fuel through a fuel filter 36 and a fuel pressure regulator 38 to fuel discharge line 32. A fuel return line 40 directs excess fuel from fuel pressure regulator 38 back into primary tank 10.

As the fuel pump portion of fuel pump/fuel level sender assembly 34 delivers fuel from primary tank 10, the fuel level within primary tank 10 falls, and balance pipe 20 transfers fuel from secondary tank 18 to primary tank 10. It should be noted that balance pipe 20 will act as a siphon—transferring fuel from secondary tank 18 to primary tank 10—when the fuel level in secondary tank 18 falls below the intermediate section of the balance pipe 20, until the fuel level in secondary tank 18 falls below the vertical section 26 of balance pipe 20.

Balance pipe 20 accordingly is effective to maintain the fuel level in secondary tank 18 close to the fuel level in primary tank 10. Thus by measuring the fuel level in primary tank 10, the fuel level sender portion of fuel pump/fuel level sender assembly 34 will provide an appropriate indication of the fuel level in both tanks.

A vent line 42 extends to a fuel vapor storage canister (not shown). Vent line 42 has a first branch 44 extending to primary tank 10, and a second branch 46 extending to secondary tank 18. Each branch is controlled by a refueling vent valve assembly 48 (sometimes called an onboard refueling vapor recovery or ORVR valve assembly). As fuel is introduced to primary tank 10 through filler pipe 12 and to secondary tank 18 through balance pipe 20, air and fuel vapor within tanks 10 and 18 is displaced through vent line 42 to the fuel vapor storage canister; the fuel vapor storage canister traps the fuel vapor for subsequent purging to the engine. However, as the tanks approach their maximum capacity, refueling vent valve assemblies 48 close to prevent liquid fuel from overflowing through vent line 42. Later, as fuel is discharged from secondary tank 18 through balance pipe 20 and from primary tank 10 through discharge line 32, air flows back through vent line 42 into the tanks.

Vent line 42 also has a third branch 50 extending to primary tank 10, and a fourth branch 52 extending to secondary tank 18. Each branch 50 and 52 is controlled by a grade vent valve assembly 54. Vent line branches 50 and 52 have a smaller flow area than vent line branches 44 and 46, but function in a similar manner. As fuel is introduced to primary tank 10 through filler pipe 12 and to secondary tank 18 through balance pipe 20, air and fuel vapor within tanks 10 and 18 is displaced through branches 50 and 52 to the fuel vapor storage canister. However, grade vent valve assemblies 54 are located higher than refueling vent valve assemblies 48, and thus remain open to prevent excessive tank pressure after refueling vent valve assemblies 48 close.

Closure of the refueling vent valve assemblies 48 normally causes the incoming fuel to accumulate momentarily in filler pipe 12, which shuts off the flow from the filler nozzle (not shown). However, should further fuel be introduced through filler pipe 12, or should the attitude of the fuel system vary from normal operation, the grade vent valve assemblies 54 also close to prevent liquid fuel from overflowing through vent line 42.

In addition, vent line 42 may have a fifth branch 56 extending to filler pipe 12 to return to the filler pipe 12 a portion of the air and fuel vapor displaced from the tanks as fuel is introduced to the tanks.

Vent line 42, with its branches 44, 46, 50, 52 and 56, also receives air and fuel vapor displaced from the tanks as the tank temperature increases, conducting the fuel vapor to the fuel vapor storage canister where it is trapped for subsequent purging to the engine. Similarly, air flows back into the tanks through vent line 42 as the tank temperature decreases.

A pressure sensor 58 may be located in either tank—shown here in secondary tank 18—to provide a tank pressure signal to an on-board diagnostic system (sometimes called an OBD II system, not shown).

Figure 2:
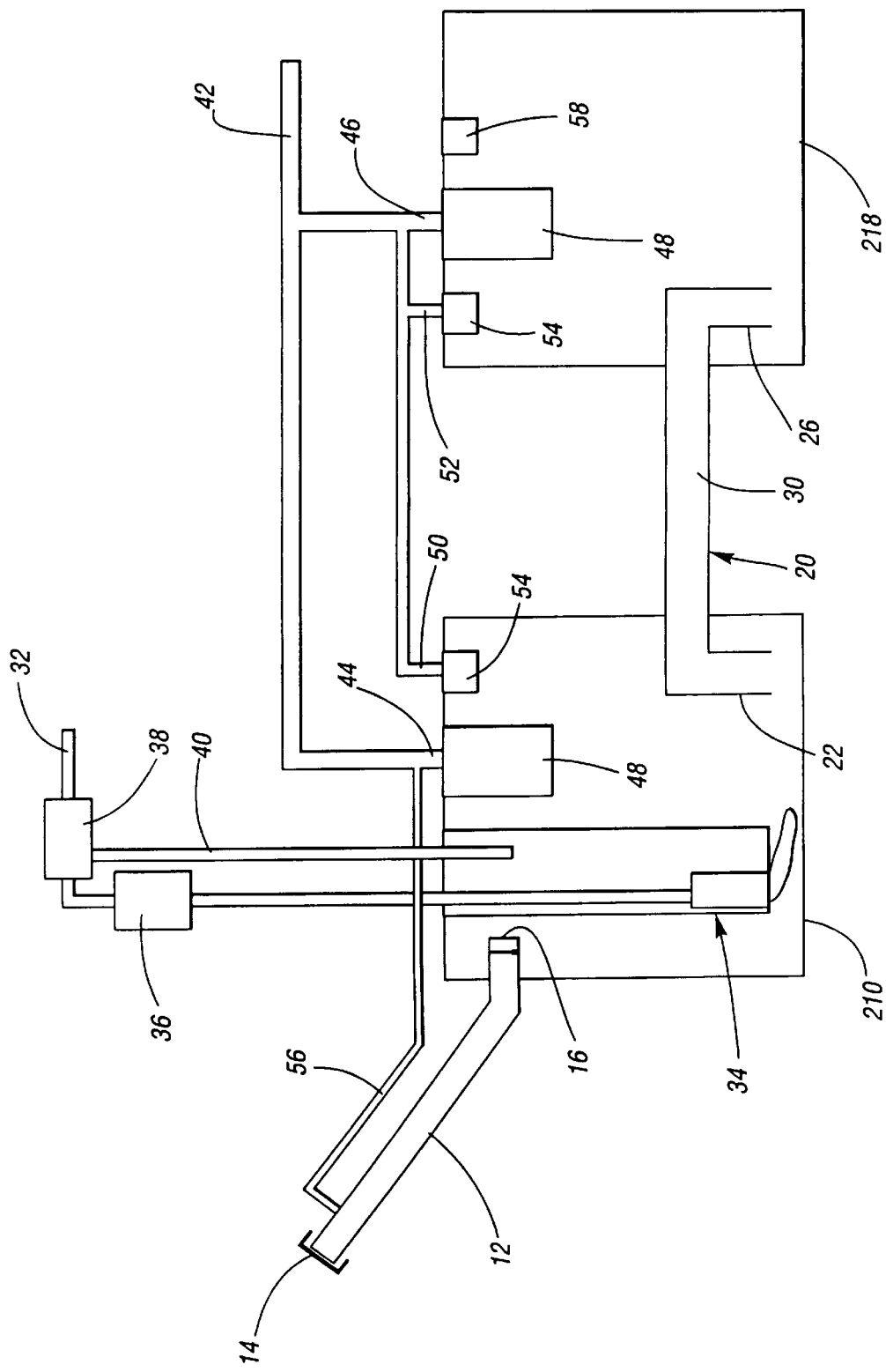
FIG. 2 is a schematic view of a second embodiment of the dual tank fuel system provided by this invention.

The embodiment shown in FIG. 2 is similar in many respects to the FIG. 1 embodiment, and identical reference numerals are used to identify identical parts.

As shown in FIG. 2, the fuel system has a primary tank 210, and a secondary tank 218 connected to primary tank 210 by a balance pipe 20. Balance pipe 20 has a vertical section 22 open to the bottom of primary tank 210, a vertical section 26 open to the bottom of secondary tank 218, and an intermediate section 30 interconnecting the vertical sections 22 and 26.

When fuel is introduced to primary tank 210 through filer pipe 12, the fuel level in primary tank 210 rises until it fills balance pipe 20. Then as additional fuel is introduced to primary tank 210, balance pipe 20 transfers fuel to secondary tank 218. Later, as fuel pump assembly 34 delivers fuel from primary tank 210, the fuel level within primary tank 210 falls, and balance pipe 20 transfers fuel from secondary tank 218 to primary tank 210. Here, too, balance pipe 20 will act as a siphon—transferring fuel from secondary tank 218 to primary tank 210—when the fuel level in secondary tank 218 falls below the intermediate section of the balance pipe 20, until the fuel level in secondary tank 218 falls below the vertical section 26 of balance pipe 20.

The fuel pump/fuel level sender assembly 34, the vent system, and the pressure sensor 58 operate in the FIG. 2 embodiment in the same manner as in the FIG. 1 embodiment.

Figure 3:
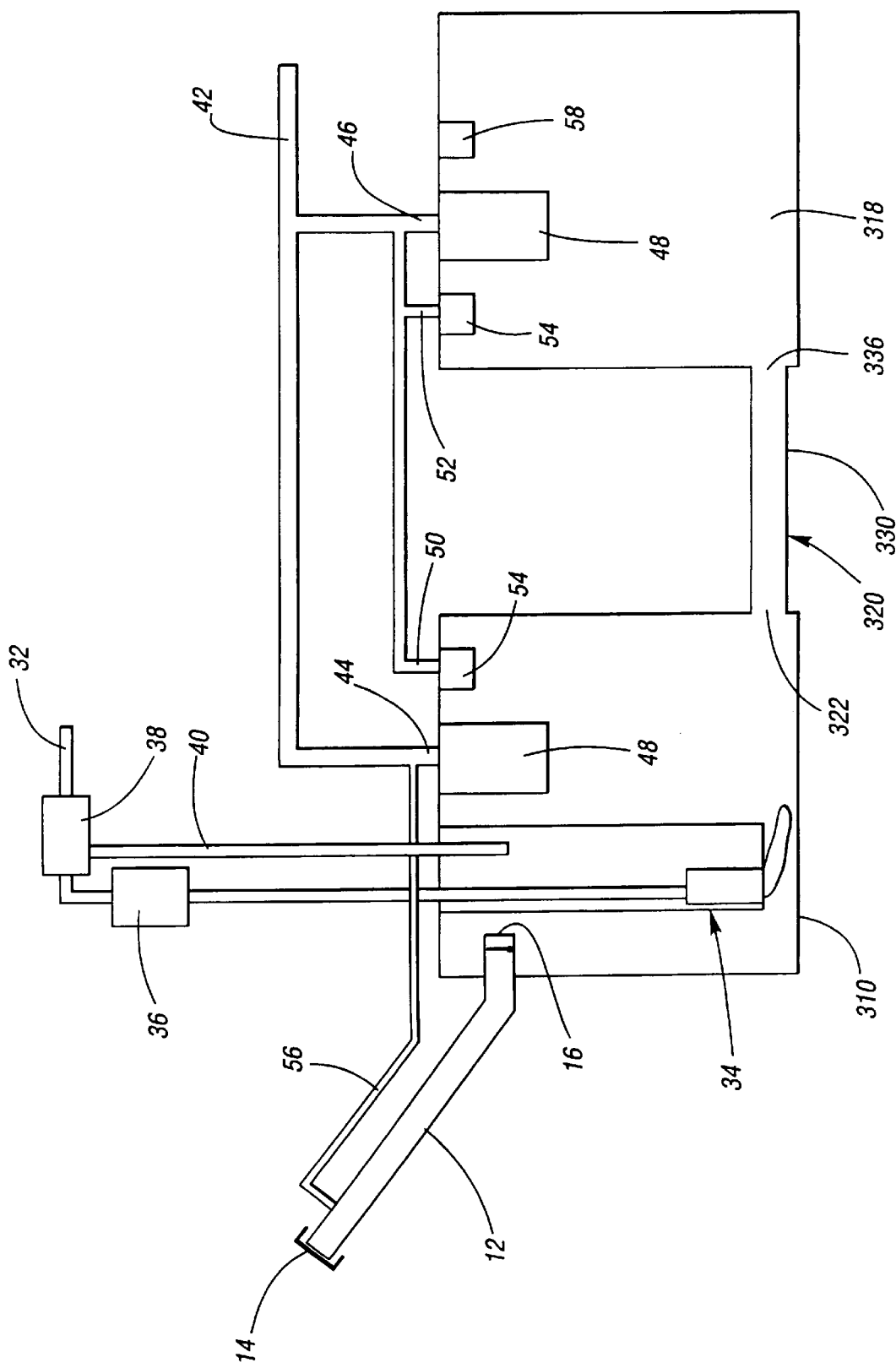
FIG. 3 is a schematic view of a third embodiment of the dual tank fuel system provided by this invention.

The embodiment shown in FIG. 3 is similar in many respects to the FIG. 1 and FIG. 2 embodiments, and identical reference numerals are used to identify identical parts.

As shown in FIG. 3, the fuel system has a primary tank 310, and a secondary tank 318 connected to primary tank 310 by a balance pipe 320. The end 322 of balance pipe 320 opens horizontally to the bottom of primary tank 310, the end 326 of balance pipe 320 opens horizontally to the bottom of secondary tank 318, and an intermediate section 330 interconnects the ends 322 and 326.

When fuel is introduced to primary tank 310 through filler pipe 12, balance pipe 320 transfers fuel to secondary tank 318. Later, as fuel pump assembly 34 delivers fuel from primary tank 310, balance pipe 320 transfers fuel from secondary tank 318 to primary tank 310.

The fuel pump/fuel level sender assembly 34, the vent system, and the pressure sensor 58 operate in the FIG. 3 embodiment in the same manner as in the FIG. 1 and FIG. 2 embodiments.

Figure 4:
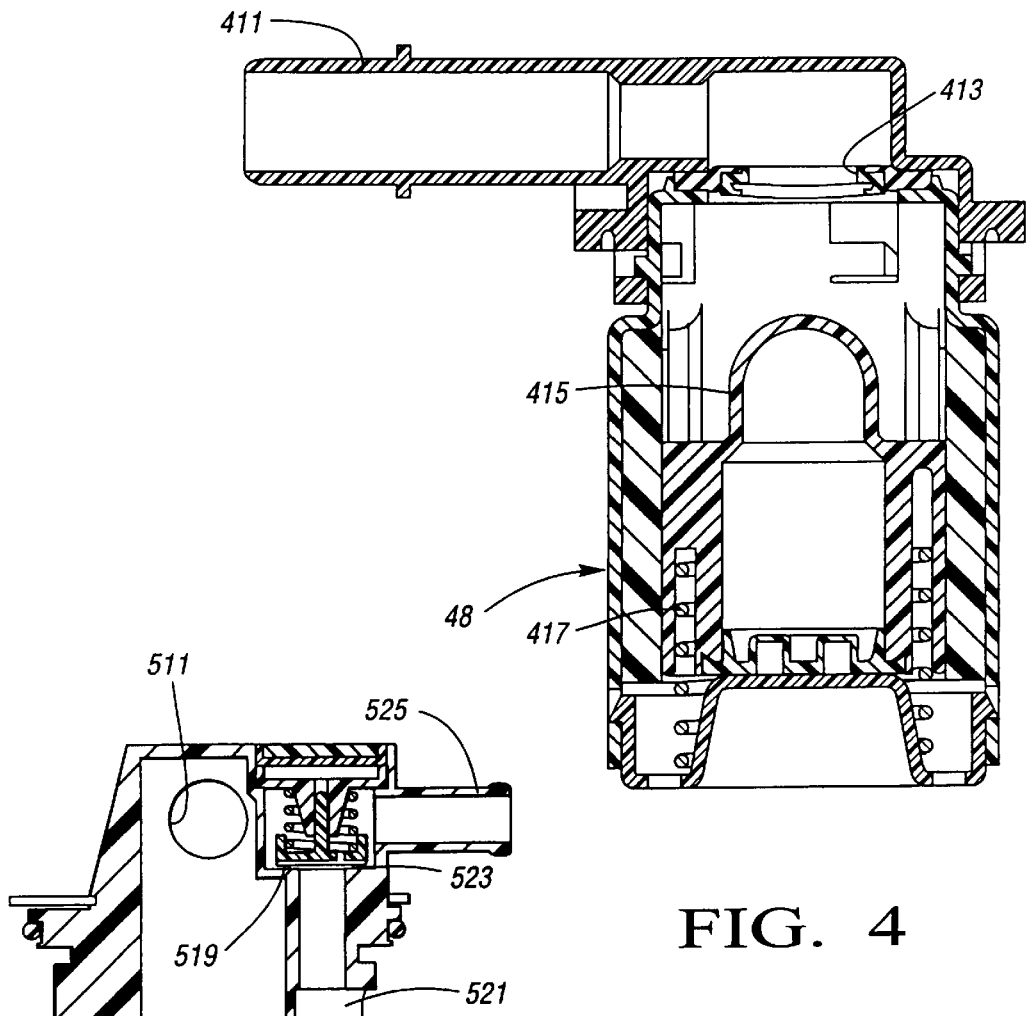
FIG. 4 is an axial sectional view of one refueling vent valve assembly that may be used in this system.

Refueling vent valve assembly 48 may be constructed and operate in a conventional manner; one example is shown in FIG. 4. This refueling vent valve assembly 48 has a fitting 411 adapted for connection to vent line branch 44 or 46, and a valve seat 413 through which air and fuel vapor flow from the tank to the vent line. A float valve 415 is responsive to movement of liquid fuel toward valve seat 413, and engages valve seat 413 to obstruct flow of liquid fuel through the vent line. Should the attitude of the fuel system vary from normal operation, a spring 417 urges float valve 415 into engagement with valve seat 413 to obstruct flow of liquid fuel through the vent line.

Figure 5:
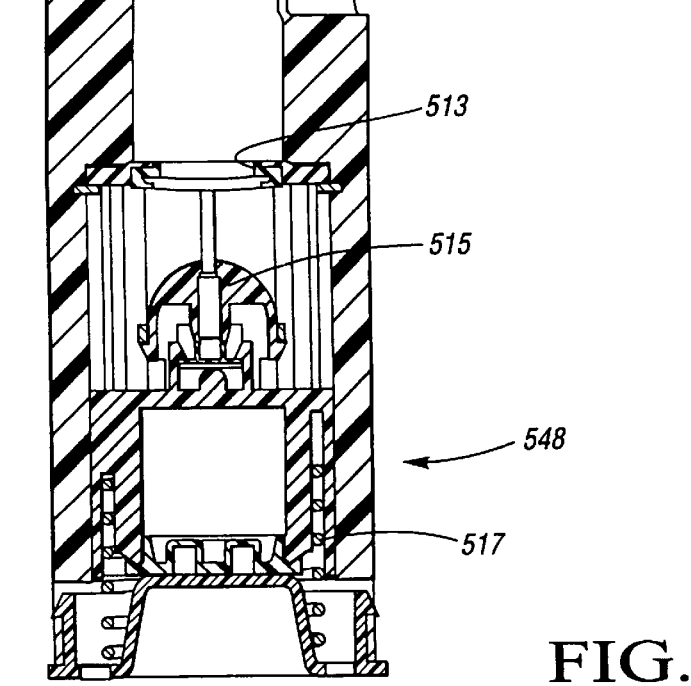
FIG. 5 is an axial sectional view of another refueling vent valve assembly that may be used in this system.

Another refueling vent valve assembly 548 is shown in FIG. 5. Refueling vent valve assembly 548 has a fitting 511 adapted for connection to vent line branch 44 or 46, and a valve seat 513 through which air and fuel vapor flow from the tank to the vent line. A float valve 515 is responsive to movement of liquid fuel toward valve seat 513, and engages valve seat 513 to obstruct flow of liquid fuel through the vent line. Should the attitude of the fuel system vary from normal operation, a spring 517 urges float valve 515 into engagement with valve seat 513 to obstruct flow of liquid fuel through the vent line.

In addition, refueling vent valve assembly 548 has a pressure relief valve 519 exposed through an aperture 521 to the pressure within the tank. Should the pressure within the tank exceed a selected value, pressure relief valve 519 lifts from its valve seat 523 to vent the excess pressure through a fitting 525 to the atmosphere.

Figure 6:
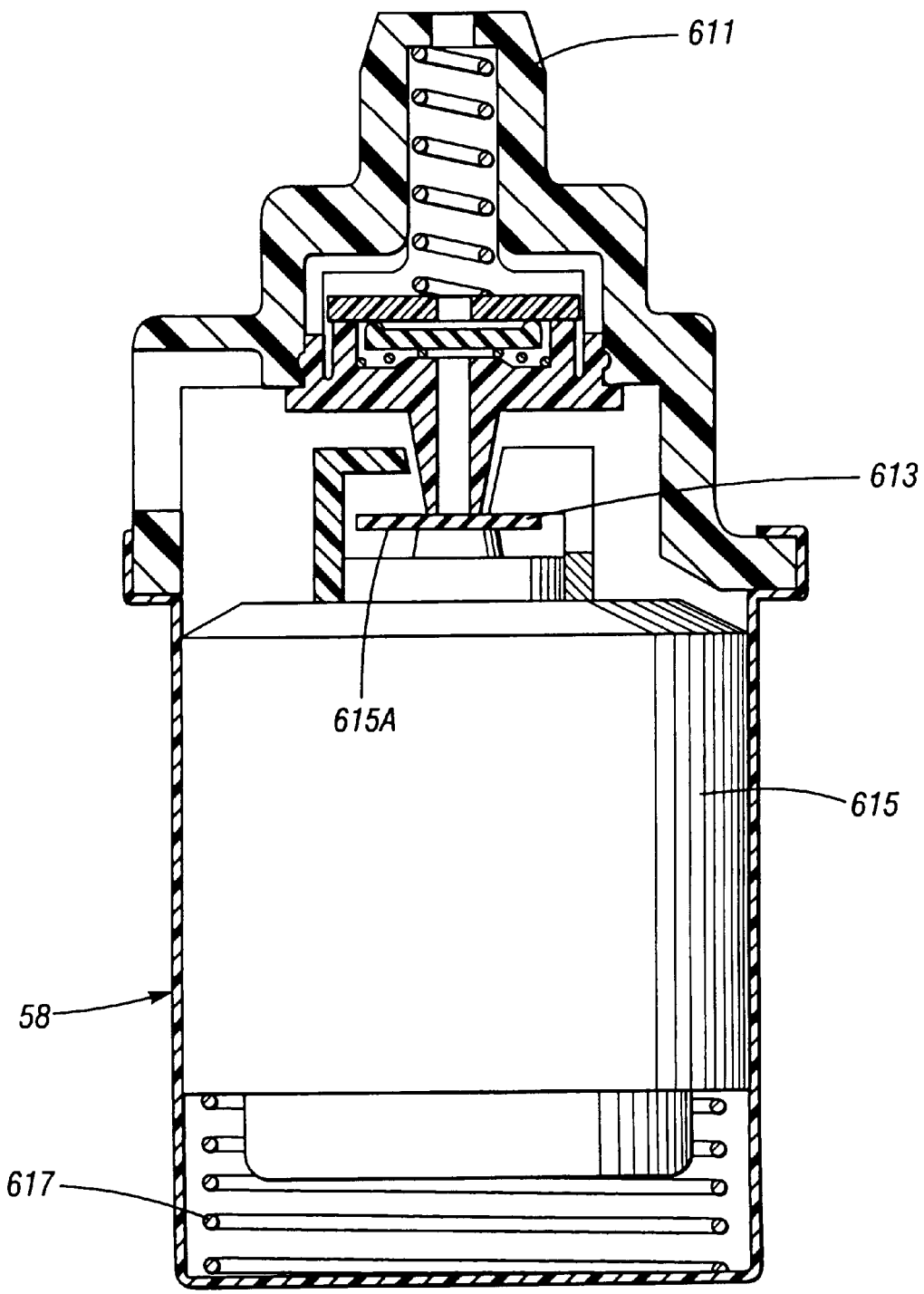
FIG. 6 is an axial sectional view of a grade vent valve assembly that may be used in this system.

Grade vent valve assembly 58 also may be constructed and operate in a conventional manner; one example is shown in FIG. 6. This grade vent valve assembly 58 has a fitting 611 adapted for connection to vent line branch 50 or 52, and a valve seat 613 through which air and fuel vapor flow from the tank to the vent line. A float 615 is responsive to movement of liquid fuel toward valve seat 613, and engages a valve disc 615A with valve seat 613 to obstruct flow of liquid fuel through the vent line. Should the attitude of the fuel system vary from normal operation, a spring 617 biases float 615 to cause valve disc 615A to engage valve seat 613 and obstruct flow of liquid fuel through the vent line. Grade vent valve assembly 58 may employ other details of construction and operation set forth in U.S. Pat. No. 4,753,262.

From the foregoing, it will be apparent that this invention provides a dual tank fuel system of minimum complexity—requiring only a single filler neck and fuel pump/fuel level sender assembly—but which retains all the functionality desired.

We claim:

1. A fuel system comprising separate primary and secondary enclosed tanks, a filler pipe opening into the primary tank through which the primary tank receives fuel, a discharge line opening from the primary tank, a balance pipe interconnecting the interior of the primary tank and the interior of the secondary tank, the balance pipe opening above the bottom of each tank and having its highest point below the maximum fuel level in each tank to direct fuel from the primary tank to the secondary tank as the primary tank receives fuel through the filler pipe and to direct fuel from the secondary tank to the primary tank as fuel is discharged from the primary tank through the discharge line, and a vent line having a first branch connected to the interior of the primary tank and a second branch connected to the interior of the secondary tank, the vent line branches opening close to the top of each tank to direct fuel vapor from the tanks as the primary tank receives fuel through the filler pipe and the balance pipe directs fuel from the primary tank to the secondary tank and further to admit air to the tanks as fuel is discharged from the primary tank through the discharge line and the balance pipe directs fuel from the secondary tank to the primary tank.

2. The fuel system of claim 1 wherein each tank includes a vent valve assembly having a valve seat surrounding an opening from the tank interior to the associated vent line branch, and a float valve engageable with the valve seat to obstruct flow of liquid fuel through the opening and the associated vent line branch.

3. The fuel system of claim 2 wherein the vent line has a third branch connected to the interior of the primary tank and a fourth branch connected to the interior of the secondary tank, the third and fourth vent line branches opening close to the top of each tank to direct fuel vapor from the tanks as the primary tank receives fuel through the filler pipe and the balance pipe directs fuel from the primary tank to the secondary tank and further to admit air to the tanks as fuel is discharged from the primary tank through the discharge line and the balance pipe directs fuel from the secondary tank to the primary tank, and wherein each tank further includes a grade vent valve assembly having a valve seat surrounding an opening from the tank interior to the associated vent line branch, and a float valve engageable with the valve seat to obstruct flow of liquid fuel through the opening and the associated vent line branch.

4. The fuel system of claim 3 wherein the vent line has a fifth branch connected to the interior of the filler pipe to direct a portion of the fuel vapor displaced from the primary tank to the filler pipe.

5. The fuel system of claim 1 wherein each tank has a depression at the bottom, and wherein the balance pipe has a first vertical section opening within the associated depression of the primary tank, a second vertical section opening within the associated depression of the secondary tank, and an intermediate section between the vertical sections.

6. The fuel system of claim 1 wherein the balance pipe has a first vertical section opening close to the bottom of the primary tank, a second vertical section opening close to the bottom of the secondary tank, and an intermediate section between the vertical sections.

7. A fuel system comprising primary and secondary enclosed tanks, a filler pipe opening into the primary tank through which the primary tank receives fuel, a discharge line opening from the primary tank, a balance pipe interconnecting the interior of the primary tank and the interior of the secondary tank, the balance pipe opening close to the bottom of each tank to direct fuel from the primary tank to the secondary tank as the primary tank receives fuel through the filler pipe and to direct fuel from the secondary tank to the primary tank as fuel is discharged from the primary tank through the discharge line, and a vent line having a first branch connected to the interior of the primary tank and a second branch connected to the interior of the secondary tank, the vent line branches opening close to the top of each tank to direct fuel vapor from the tanks as the primary tank receives fuel through the filler pipe and the balance pipe directs fuel from the primary tank to the secondary tank and further to admit air to the tanks as fuel is discharged from the primary tank through the discharge line and the balance pipe directs fuel from the secondary tank to the primary tank, wherein the vent line has a third branch connected to the interior of the primary tank and a fourth branch connected to the interior of the secondary tank, the third and fourth vent line branches opening close to the top of each tank to direct fuel vapor from the tanks as the primary tank receives fuel through the filler pipe and the balance pipe directs fuel from the primary tank to the secondary tank and further to admit air to the tanks as fuel is discharged from the primary tank through the discharge line and the balance pipe directs fuel from the secondary tank to the primary tank, and wherein each tank further includes a grade vent valve assembly having a valve seat surrounding an opening from the tank interior to the associated vent line branch, and a float valve engageable with the valve seat to obstruct flow of liquid fuel through the opening and the associated vent line branch.

8. The fuel system of claim 7 where the secondary tank does not include a separate filler pipe or fuel level sender.

9. A fuel system comprising separate primary and secondary enclosed tanks, a filler pipe opening into the primary tank through which the primary tank receives fuel, a discharge line opening from the primary tank, a balance pipe interconnecting the interior of the primary tank and the interior of the secondary tank, the balance pipe opening close to the bottom of each tank to direct fuel from the primary tank to the secondary tank as the primary tank receives fuel through the filler pipe and to direct fuel from the secondary tank to the primary tank as fuel is discharged from the primary tank through the discharge line, and a vent line having a first branch connected to the interior of the primary tank and a second branch connected to the interior of the secondary tank, the vent line branches opening close to the top of each tank to direct fuel vapor from the tanks as the primary tank receives fuel through the filler pipe and the balance pipe directs fuel from the primar tank to the secondary tank and further to admit air to the tanks as fuel is discharged from the primary tank through the discharge line and the balance pipe directs fuel from the secondary tank to the primary tank, wherein the balance pipe has a first end opening horizontally close to the bottom of the primary tank, a second end opening horizontally close to the bottom of the secondary tank, and an intermediate section between the horizontal sections.

* * * * *